US011622566B2

(12) United States Patent
Dolmer

(10) Patent No.: US 11,622,566 B2
(45) Date of Patent: Apr. 11, 2023

(54) GLYCERIN- AND PROTEIN-BASED FOAM CANDY PRODUCTS WITH PROBIOTIC BACTERIA

(71) Applicant: CHR. HANSEN A/S, Hoersholm (DK)

(72) Inventor: Mogens Dolmer, Humlebaek (DK)

(73) Assignee: Chr. Hansen A/S, Hoersholm (DK)

( * ) Notice: Subject to any disclaimer, the term of this patent is extended or adjusted under 35 U.S.C. 154(b) by 48 days.

(21) Appl. No.: 16/469,557

(22) PCT Filed: Dec. 14, 2017

(86) PCT No.: PCT/EP2017/082820
§ 371 (c)(1),
(2) Date: Jun. 13, 2019

(87) PCT Pub. No.: WO2018/109087
PCT Pub. Date: Jun. 21, 2018

(65) Prior Publication Data
US 2020/0077674 A1    Mar. 12, 2020

(30) Foreign Application Priority Data

Dec. 14, 2016  (EP) ..................... 16204132

(51) Int. Cl.
| A23G 3/36 | (2006.01) |
| A23G 3/42 | (2006.01) |
| A23G 3/44 | (2006.01) |
| A23G 3/52 | (2006.01) |
| A23G 3/48 | (2006.01) |

(52) U.S. Cl.
CPC ............... *A23G 3/366* (2013.01); *A23G 3/42* (2013.01); *A23G 3/44* (2013.01); *A23G 3/52* (2013.01); *A23G 3/362* (2013.01); *A23G 3/368* (2013.01); *A23G 3/48* (2013.01)

(58) Field of Classification Search
CPC . A23G 3/366; A23G 3/52; A23G 3/44; A23G 3/42; A23G 3/362; A23G 3/368; A23G 3/48
USPC ........................................................... 426/61
See application file for complete search history.

(56) References Cited

U.S. PATENT DOCUMENTS

| 3,814,816 A | 6/1974 | Gunther |
| 4,911,937 A * | 3/1990 | Crosello ................. A23G 3/40 426/103 |
| 9,925,752 B2 | 3/2018 | Kweon et al. |
| 2005/0153018 A1* | 7/2005 | Ubbink ................. A23K 10/30 426/61 |
| 2008/0166449 A1 | 7/2008 | Kabse et al. |
| 2009/0181145 A1* | 7/2009 | Pandey .................... A23G 1/40 426/474 |
| 2011/0256216 A1* | 10/2011 | Lefkowitz ................ A61K 9/48 424/451 |
| 2012/0015075 A1* | 1/2012 | Davis ....................... A23G 3/42 426/61 |
| 2012/0064606 A1* | 3/2012 | Cho ....................... C12M 47/10 435/252.9 |
| 2014/0087049 A1 | 3/2014 | Ankolekar et al. |
| 2018/0228179 A1 | 8/2018 | Dolmer et al. |

FOREIGN PATENT DOCUMENTS

| CN | 103444969 A | 12/2013 |
| EP | 1 064 855 A1 | 1/2001 |
| EP | 1 398 369 A1 | 3/2004 |
| JP | H11-266860 A | 10/1999 |
| JP | 2005-519600 A | 7/2005 |
| WO | WO-03/075676 A1 | 9/2003 |
| WO | WO-2004/014152 A1 | 2/2004 |
| WO | WO-2008/117066 A1 | 10/2008 |
| WO | WO-2013/001089 A1 | 1/2013 |
| WO | WO-2014/014152 A | 1/2014 |
| WO | WO-2016/198440 A1 | 12/2016 |

OTHER PUBLICATIONS

China National Intellectual Property Administration; Second Office Action; Chinese Patent Application No. 201780075277.2; dated Oct. 9, 2022; 16 pages (including English translation).
Pan, Chunmei; "Production and Application of Microecological Preparation", China Agricultural University Press, 1st edition; published Sep. 30, 2014; p. 177.

* cited by examiner

*Primary Examiner* — Hamid R Badr
(74) *Attorney, Agent, or Firm* — Foley & Lardner LLP

(57) ABSTRACT

The present invention relates to a glycerin- and protein-based candy product comprising probiotic bacteria, said product having a moisture content less than 9% and a water activity (aw) of less than 0.5 and comprising a) glycerin in an amount of at least 5% (w/w), b) at least one saccharide or at least one polyol which is not glycerin, or a mixture thereof, c) at least one protein which is not gelatin, and d) at least one species of a probiotic bacterium, and optionally e) at least one hydrocolloid. In a presently preferred embodiment the protein is a hydrolyzed protein. Further, the invention relates to processes for producing a glycerin- and protein-based candy product comprising probiotic bacteria.

15 Claims, No Drawings

GLYCERIN- AND PROTEIN-BASED FOAM CANDY PRODUCTS WITH PROBIOTIC BACTERIA

CROSS-REFERENCE TO RELATED APPLICATIONS

The present application is the U.S. National Stage of International Application No. PCT/EP2017/082820, filed Dec. 14, 2017 and claims priority to European Patent Application No. 16204132.1 filed Dec. 14, 2016.

FIELD OF THE INVENTION

The present invention relates to glycerin- and protein-based foam candy products comprising heat and/or moisture-sensitive ingredients such as probiotic bacteria and processes for producing glycerin- and protein-based foam candy products comprising heat and/or moisture-sensitive ingredients such as probiotic bacteria.

More specifically, the present invention relates to a glycerin- and protein-based foam candy product comprising probiotic bacteria, said product having a moisture content less than 9% and a water activity ($a_w$) of less than 0.5 and comprising
 a) glycerin in an amount of at least 5% (w/w),
 b) at least one saccharide or at least one polyol which is not glycerin, or a mixture thereof,
 c) at least one protein which is not gelatin, and
 d) at least one species of a probiotic bacterium, and optionally
 e) at least one hydrocolloid.

Further, the invention relates to a process for preparing a glycerin- and protein-based foam candy product comprising glycerin in an amount of at least 5% (w/w) and probiotic bacteria, said product having a moisture content less than 9% and a water activity ($a_w$) of less than 0.5, wherein said process comprises mixing without addition of water
 a) glycerin in an amount of at least 5% (w/w),
 b) at least one saccharide or at least one polyol which is not glycerin, or a mixture thereof,
 c) at least one protein which is not gelatin, and adding
 d) at least one species of a probiotic bacterium.

BACKGROUND OF THE INVENTION

U.S. Pat. No. 3,814,816 describes that in the food industry, proteinaceous materials, such as egg whites, hydrolyzed milk proteins and soy albumen, have been used for many years as aerating agents. By an aerating agent is meant a material capable of entrapping air in an aqueous mix, such as the basic sugar-syrup mix used in the confectionery trade or the flour-sugar mixes used in the bakery field.

Foam candy is a broad category of gelatin-based candies which may be more or less chewy. Foam candy is produced with high amounts of water, syrup and sugar which are boiled at a temperature up to 120° C. Afterwards, gelatin, flavor and color are added—air is whipped into the mixture and the foam candy composition is processed at app. 60° C. into their final form.

Some foam candy products are produced by a process where proteins, such as hydrolyzed proteins, are used to help incorporate and maintain air in the foam, by whipping a blend containing warm water, at least one saccharide such as sugar, glucose syrup and/or invert sugar, protein, such as hydrolyzed protein, and optionally gelatin. Afterwards, flavor, acid, color and other ingredients can be added. The foam candy product may be covered by a shell made e.g. of chocolate or sugar. Angel kisses and candy bars are examples of such shell protected foam candy compositions.

Under conditions of lack of nutrition, certain bacteria such as Bacilli and Clostridia are able to form endospores, a dormant, tough, non-reproductive structure. Endospores can survive without nutrients. They are resistant to ultraviolet radiation, desiccation, high temperature, extreme freezing and chemical disinfectant. Until now it has only been possible to produce gelatin-based candy products with spore-forming probiotic bacteria such as Bacilli.

To the best of our knowledge, no documents describe or point to a process for producing foam candy products without adding water nor to the glycerin- and protein-based foam candy product comprising probiotic bacteria of the present invention.

CN103444969 discloses a pressed probiotic tablet candy comprising a very low amount of glycerol, xylitol, trehalose, and gelatin. CN103444969 does not disclose a glycerin- and protein-based foam candy product having a moisture content less than 9% and comprising glycerin in an amount of at least 5% (w/w) and probiotic bacteria nor a process for preparing such a product, but rather a chewable tablet.

When embodiment 1 of CN103444969 in step 1) describes a process for preparing a probiotic tablet candy comprising mixing trehalose 15%, glycerol 5%, gelatin 0.12% with various bacteria it is evident that this composition is a cryoprotectant added to protect the bacteria before the spray-drying. In step 2) 20 parts of the Mixed Microbes powder comprising 5% glycerin is added to app. 80 parts of other components so the content of glycerin in the final product is only 20% of 5%, i.e. 1%. Further, it is evident from step 4) that the product is manufactured as a compressed tablet. Thus, CN103444969 does clearly not disclose a glycerin- and protein-based foam candy product of the present invention nor a process of the present invention.

WO2004/014152 describes a multi-phase oral delivery system for biologically active agents comprising a matrix phase which has final moisture content between about 10% and about 30% by weight and one or more other phases associated with the matrix phase. Probiotic bacteria are disclosed in the description but no specific examples relating to probiotic bacteria are provided. Generally, a moisture content of about 10% to about 30% as in the described oral delivery system will lead to a relatively high water activity, i.e. higher than 0.5. Consistent herewith, the only water activity measurement (in Example 8 which is a sample prepared according to the method described in example 4) is between 0.51 and 0.55.

Example 4 and 9 describe the preparation of a delivery system containing a Bioactive wherein the matrix comprises 24.8% high fructose syrup which is known to have a water content of 19-31%, and 21.2% DE Corn syrup which is known to have a water content of 15-19%. Assuming conservatively that the syrups contain respectively 20% and 15% of water, a minimum of 8% of water is added with the syrup. Further, app. 5% of water is added in both examples.

Thus, a minimum of 13% of water is added in the example. It is further held (page 73, lines 10-11) that the solid content may be adjusted to the desired level by addition of water.

As evident from the above, the moisture content of the matrices disclosed in Examples 4 and 9 will be much more than 9% and the water activity more than 0.5 and the matrices will not be suitable for the preparation of a glycerin- and protein-based foam candy product of the present invention.

WO2013/001089 describes dry compositions for stabilizing probiotic bacteria and provides specific compositions which are stable without the presence of a salt of alginic acid. WO2013/001089 does not provide any disclosure of a glycerin- and protein-based foam candy product of the present invention.

In EP 1 398 369 example 5 describes soft gel capsules with probiotic bacteria. By a soft gel capsule is generally understood a soft gelatin based shell surrounding a fill material. The described soft gel capsules do not contain any saccharide or polyol other than glycerol. Clearly, EP 1 398 369 does not disclose a glycerin- and protein-based foam candy product of the present invention.

EP 1 064 855 discloses food, medicine and cosmetics containing vegetables or fruits which have a *Bifidobacterium* proliferation promoting action and are presumed to be useful for preventing or treating various conditions. Example 5 provides a description of a capsule comprising a freeze-dried powder of *Bifidobacterium*, freeze-dried Broccoli, gelatin and glycerin. The described compositions do not contain any polyol other than glycerin and EP 1 064 855 does not provide any disclosure of saccharides. As evident from the above, EP 1 064 855 does not disclose a glycerin- and protein-based foam candy product of the present invention.

US2014/0087049 discloses a shelf stable liquid sweetener and flavor additive having a water activity below 0.8 and that glycerol functions as a water activity reducing compound through its hygroscopic properties which reduces the vapor pressure of the liquid mixture, resulting in a lowered water activity ($a_w$ value). It is further described that liquid mixtures with water activity values of less than 0.7 are not conducive for microbial growth. No lower water activity values than less than 0.7 are described.

SUMMARY OF THE INVENTION

PCT/EP2016/063006 filed on Jun. 8, 2016, published as WO2016/198440, describes that by substituting most of the water present in a candy product with glycerin, it is possible to reduce the water activity ($a_w$) in the final product from normally 0.6-0.9 to less than 0.5 while maintaining similar features (texture, sweetness, taste and appearance) as conventional water-based candy products.

The present invention is a further development of the glycerin-based compositions with probiotic bacteria as described in WO2016/198440.

It has surprisingly been found that when at least one protein which is not gelatin, such as hydrolyzed protein, is added to a non-aqueous composition comprising glycerin and at least one saccharide or at least one polyol which is not glycerin, or a mixture thereof, it is possible to obtain a stable foam candy composition which is ideal as a carrier for heat and/or moisture-sensitive ingredients such as probiotic bacteria.

The glycerin- and protein-based foam candy composition may be further stabilized by use of at least one hydrocolloid and/or incorporated in a shell which can protect the heat and/or moisture-sensitive ingredient(s) against moisture and physical stress. The shell can provide stability to the foam candy composition and protect against moisture, oxygen and light and can be made e.g. of chocolate or sugar. Angel kisses and candy bars are illustrative examples of such shell protected compositions.

In some embodiments of the glycerin- and protein-based foam candy product the heat and/or moisture-sensitive ingredient(s), such as the probiotic bacteria, are incorporated into the glycerin- and protein-based foam candy composition at a temperature of 50° C. to 60° C.

In other embodiments of the invention, the probiotic bacteria are placed as one or more tablets/granulates (one large tablet or many small tablets/granulates) on the surface of the glycerin- and protein-based foam candy product.

In a yet further embodiment of the invention, the probiotic bacteria are placed as a powder or as one or more tablets/granulates (one large tablet or many small tablets/granulates) between two or more layers of glycerin- and protein-based foam candy composition or placed between two or more layers of glycerin- and protein-based foam candy composition or gummy candy composition. Thus, the foam candy product of the present invention may comprise a combination of gummy candy and foam candy composition.

DETAILED DISCLOSURE OF THE INVENTION

Mixtures of saccharide with protein, such as hydrolyzed protein, in aqueous media are known and used e.g. in the confectionery industry to prepare foam candy products e.g. marshmallows, angel kisses and candy bars.

The saccharide is necessary to stabilize the foam by increasing the viscosity.

The present inventor has surprisingly found that it is possible to prepare a mixture of glycerin, at least one saccharide and at least one protein which is not gelatin, such as hydrolyzed protein, without adding any water making it possible to produce a foam candy composition having a low water content and a low $a_w$. Heat and/or moisture-sensitive ingredients such as probiotic bacteria can be added to this composition to provide a product having a high number of viable probiotic bacteria.

Evidently, the foam candy composition can be useful also for other heat and/or moisture-sensitive ingredients such as pharmaceuticals and vitamins, e.g. vitamin C, thiamin, vitamin $B_{12}$, and pantothenic acid.

It is an advantage that the glycerin- and protein-based foam candy composition produced by use of at least one protein which is not gelatin, such as hydrolyzed protein, can be processed at a low temperature e.g. 50 to 55° C. giving a much higher survival of the probiotic bacteria.

After the addition of the probiotic bacteria, the foam candy composition is whipped whereby cool air is incorporated into the mixture which leads to a fast cooling due to more cool air and a high surface area of the foam.

It is presently contemplated that the observed high survival of the probiotic bacteria may be at least partly due to the above effects.

Probiotic bacteria are live microorganisms and this can be a challenge during production and formulation of final dosage forms. Probiotic bacteria are especially sensitive towards temperature, moisture content, and other ingredients present in the composition. Using a low production temperature and water activity ensure the survival of the probiotic bacteria during production and storage of the product.

Water activity ($a_w$) is defined as the partial vapor pressure of water in a composition at a specified temperature divided by the standard state partial vapor pressure of water at the same temperature. Water activity thus acts as a measure of the amount of free (i.e. unbound) water in a composition. It may be calculated as:

$$a_w = p/p_0$$

where p is the partial vapor pressure of water in the composition and $p_0$ is the vapor pressure of pure water at the same temperature.

Alternatively, water activity may be calculated as:

$$a_w = l_w x_w$$

where $l_w$ is the activity coefficient of water and $x_w$ is the mole fraction of water.

The two calculations above which define $a_w$ are equivalent.

Water activity may be measured by methods known to those skilled in the art, for example as done in the present examples with a Novasina LabMaster & LabPartner at 20° C.

The water activity, $a_w$, measures the water which is free to be utilized by the bacteria. As will be known by the person skilled in the art, the moisture content refers to the total water, the quantity of water contained in a material.

The moisture content may be calculated by summing up the quantity of water contained in the various ingredients of the product and dividing with the weight of the product. For practical purposes the moisture content can be measured with a Sartorius Moisture Meter MA 35 (thermogravimetric moisture meter) and ensuring conditions where all water is evaporated. Generally, this may be accomplished by setting the temperature to 130° C. and the time to 20 minutes.

The moisture content of the glycerin- and protein-based foam candy product or composition of the invention (free water+bound water i.e. water bound in cells and hydrocolloid) is less than 9%. More preferably, the moisture content of the glycerin- and protein-based foam candy product or composition of the invention is no more than 8% (w/w), such as no more than 7% (w/w), no more than 6% (w/w), no more than 5% (w/w), no more than 4% (w/w), no more than 3% (w/w), e.g. no more than 2% (w/w).

The glycerin- and protein-based foam candy product or composition of the invention comprises at least one protein which is not gelatin. When the term "protein" is used in the present specification and claims, reference is meant to be such other proteins. In the present context, the term "protein" includes entire protein and hydrolyzed protein, polypeptides, peptides and amino acids.

"Hydrolyzed protein" refers to protein that has been subjected to partial or full acid or enzymatic hydrolysis to yield a hydrolyzed protein having a molecular weight of from about 200 dalton to about 50 kDa. Preferably, at least 20% of the protein substrate is converted into peptides having molecular masses from 200 to 2000 dalton. The hydrolyzed protein has approximately the same amino acid composition as full protein and may be obtained from any number of commercial sources.

Preferably, the at least one protein is pea, soy, whey, rice or casein and more preferably, hydrolyzed pea, hydrolyzed soy, hydrolyzed whey, hydrolyzed rice or hydrolyzed casein. The composition may comprise one or more proteins, such as one, two or three or even more different proteins which may be hydrolyzed.

Preferably, the protein content of the glycerin- and protein-based foam candy product or composition of the invention is in the range of 0.01% to 50% (w/w), such as in the range of 0.1% to 20% (w/w), e.g. in the range of 0.2% to 10% (w/w), preferably in the range of 0.25% to 5% (w/w).

In its broadest context the present invention relates to a foam candy product comprising at least one heat and/or moisture-sensitive ingredient, such as at least one species of a probiotic bacterium, said product having a moisture content less than 9% and a water activity ($a_w$) of less than 0.5 and comprising
  a) at least one polyol,
  b) at least one saccharide or at least one polyol which is not glycerin, or a mixture thereof,
  c) at least one protein which is not gelatin, and
  d) at least one heat and/or moisture-sensitive ingredient.

Optionally, the foam candy composition may be further stabilized by use of a hydrocolloid and/or incorporated in a shell.

In some embodiments, the present invention relates to a glycerin- and protein-based foam candy product comprising probiotic bacteria, said product having a moisture content less than 9% and a water activity ($a_w$) of less than 0.5 and comprising
  a) glycerin in an amount of at least 5%,
  b) at least one saccharide or at least one polyol which is not glycerin, or a mixture thereof,
  c) at least one protein which is not gelatin,
  d) at least one species of a probiotic bacterium, and optionally
  e) at least one hydrocolloid.

The term "glycerin- and protein-based foam candy composition" which in the present specification and claims is used interchangeably with "glycerin- and protein-based foam candy product" unless the context indicates otherwise comprises glycerin- and protein-based foam candy.

By the term "foam" is in the present context meant a composition that is formed by trapping pockets of air into a composition to form a spongy structure, i.e. a structure which is flexible to some extent. Examples of such products are soft foam and hard foam candy, marshmallow, candy bar, birds' milk, angel kisses and the like.

The glycerin- and protein-based foam candy product or composition of the invention is semi-solid at room temperature.

In one embodiment, the glycerin- and protein-based foam candy product of the invention comprises the probiotic bacteria dispersed in the foam candy composition. Such a product can be considered a single phase product.

Examples of this embodiment are provided. Examples 1 and 2 describe glycerin- and protein-based foam candy products containing *Bifidobacterium animalis* subsp *lactis* evenly distributed into the foam candy product wherein the amount of hydrolyzed protein is 2% in Example 1 and 5% in Example 2.

Example 3 is similar to Example 1 but the content of gelatin is reduced from 1.6% to 0.9%.

Example 4 describes a glycerin- and protein-based foam candy product which further comprises a soluble gluco fiber with *Bifidobacterium animalis* subsp *lactis* evenly distributed into the foam candy product.

In other embodiments, the glycerin- and protein-based foam candy product or composition of the invention comprises two or more phases such as three, four, five or more phases which may e.g. be layers of glycerin- and protein-based foam candy composition, gummy candy, and powder, tablets or granulates comprising probiotic bacteria. In these embodiments, the probiotic bacteria may be present in one or more of the phases or layers. It is presently preferred that the probiotic bacteria are present in one of the phases only. In a further embodiment, one species of probiotic bacteria is present in one phase and another species of probiotic bacteria is present in another phase. The phase(s) not comprising probiotic bacteria may be inert or comprise one or more other active ingredients as described in further detail in the following.

The glycerin- and protein-based foam candy product or composition of the invention is substantially dissolvable in water in contrast to chewing gum which by definition comprises a substantial amount of substances such as gum base which are insoluble in water. By the term "insoluble" is meant that less than 0.1 g per 100 mL of solvent such as water can be dissolved.

Preferably, the glycerin- and protein-based foam candy product or composition comprises no more than 5% (w/w) insoluble substances, such as no more than 4% (w/w) insoluble substances, no more than 3% (w/w) insoluble substances, no more than 2% (w/w) insoluble substances, no more than 1% (w/w) insoluble substances, e.g. no more than 0.5% (w/w) insoluble substances.

In some embodiments, the glycerin- and protein-based foam candy product or composition of the invention is substantially digestible. In other embodiments the glycerin- and protein-based foam candy product or composition of the invention comprises one or more oligo- or polysaccharides which can be only partially digested by humans, such as fructo-oligosaccharides (FOS), galactooligosaccharides (GOS), soluble corn fiber, soluble gluco fiber, and inulin, as discussed in further detail later.

In some embodiments, the water activity ($a_w$) is no more than 0.4, such as no more than 0.3, e.g. no more than 0.2. In some embodiments, the water activity ($a_w$) is in the range of 0.05 to 0.3, e.g. in the range of 0.05 to 0.2 or 0.1 to 0.2.

Glycerin (glycerol; propane-1,2,3-triol) is a colorless, odorless, viscous liquid that is widely used in pharmaceutical formulations. Glycerol has three hydroxyl groups that are responsible for its solubility in water and its hygroscopic nature. The glycerol backbone is central to all lipids known as triglycerides. Glycerol is sweet-tasting and generally considered non-toxic.

Glycerin is present in an amount of at least 5%, such as at least 6%, at least 7%, at least 8%, at least 9%, e.g. at least 10%. Preferably glycerin is present in an amount in the range of 5% to 40%, such as 10% to 40% (w/w) of the composition. In some embodiments, the glycerin is present in an amount of 15% to 35% (w/w) of the composition, such as 20% to 30% (w/w) of the composition.

The composition may further comprise at least one polyol which is not glycerin. When the term "polyol" is used in the present specification and claims, reference is meant to be such other polyols.

In some embodiments, the composition comprises at least one saccharide or at least one polyol. In other embodiments, the composition comprises a mixture of at least one saccharide and at least one polyol.

The saccharide may be a mono-, di-, oligo- or polysaccharide, or a mixture of at least two saccharides. The composition may even comprise three, four or more saccharides. In some embodiments, the composition comprises a mixture of at least one mono- or disaccharide and at least one oligosaccharide. In other embodiments, the composition comprises a mixture of at least one mono- or disaccharide and at least one polysaccharide.

In further embodiments, the composition comprises a mixture of at least one mono-, di-, oligo- or polysaccharide and at least one polyol. In some embodiments, the composition comprises a mixture of at least one monosaccharide and at least one polyol. In other embodiments, the composition comprises a mixture of at least one disaccharide and at least one polyol. In yet other embodiments, the composition comprises a mixture of at least one oligosaccharide and at least one polyol. In further embodiments, the composition comprises a mixture of at least one polysaccharide and at least one polyol.

Monosaccharides useful in the composition of the present invention include glucose (also known as dextrose), fructose and galactose. The table or granulated sugar most customarily used is sucrose, a disaccharide. In the body, sucrose hydrolyses into fructose and glucose.

Disaccharides useful in the composition of the present invention include among other sucrose, maltose and lactose. Presently preferred mono- or disaccharides according to the present invention are sucrose, glucose, fructose and galactose. The composition may comprise one or more mono- or disaccharides, such as one, two or three or even more different saccharides.

In one embodiment, the at least one saccharide is a disaccharide such as sucrose. In some embodiments, the sucrose is powdered, also called confectioner's sugar or icing sugar. In the examples made by adding icing sugar, the texture of the products is much like that of gelatin-based candy products.

In some embodiments, the composition of the invention comprises at least one oligosaccharide. An oligosaccharide is a saccharide polymer containing three to nine monosaccharides. Fructo-oligosaccharides (FOS), which are found in many vegetables, consist of short chains of fructose molecules. Galactooligosaccharides (GOS), which also occur naturally, consist of short chains of galactose molecules. These compounds can be only partially digested by humans. The composition may comprise one, two or even more different oligosaccharides.

In some embodiments the composition of the invention comprises at least one polysaccharide. Polysaccharides are polymeric carbohydrate molecules composed of more than ten monosaccharide units bound together by glycosidic linkages and on hydrolysis give the constituent monosaccharides or oligosaccharides. They range in structure from linear to highly branched. Examples include storage polysaccharides such as starch, maltodextrin and inulin. The composition may comprise one, two, three or even more different polysaccharides.

Inulin is a heterogeneous collection of fructose polymers. It consists of a glucosyl moiety and a fructosyl moiety, which are linked by β(2,1) bonds, having a degree of polymerization from 10 to 60.

The addition of oligo- or polysaccharides such as FOS, GOS, soluble corn fiber, soluble gluco fiber, inulin and other polysaccharides can assist in reduction of the water activity and has the further advantage that oligo- and polysaccharides are not quite as sweet as mono- and disaccharides and further that they add fibers to the composition.

Polyols (sugar alcohols) have the general formula HOCH2(CHOH)nCH2OH. They are commonly added to foods because of their lower caloric content and less sweetness than sugars. Furthermore they are not broken down by bacteria in the mouth or metabolized to acids, and thus do not contribute to tooth decay.

The composition may further comprise at least one polyol such as erythriol, inositol, isomalt, mannitol, maltitol, sorbitol, or xylitol, or a mixture thereof. Preferred polyols are xylitol, sorbitol and mannitol. The composition may comprise one, two, three or even more different polyols.

Appropriate organoleptic properties of the glycerin- and protein-based candy products are generally most easily obtained by using powdered or finely grinded dry ingredients. It is particularly important that the at least one saccharide and/or at least one polyol are powdered as these constitute a major part of the composition.

The at least one saccharide and/or at least one polyol which is not glycerin, or a mixture thereof, constitute up to 80% (w/w) of the composition. In some embodiments, the at least one saccharide and/or at least one polyol which is not glycerin, or a mixture thereof, constitutes 25% to 75% (w/w), e.g. 40% to 70% (w/w), such as 50% to 65% of the composition. If more than one saccharide and/or polyol which is not glycerin is used, the ratio can vary depending on how many and which saccharide(s) or polyol(s) are used.

A hydrocolloid is defined as a colloid system wherein the colloid particles are hydrophilic polymers dispersed in water. Many hydrocolloids are derived from natural sources. For example, gelatin is produced by hydrolysis of proteins of mammalian and fish origins, and pectin is extracted from citrus peel and apple pomace.

Hydrocolloids are employed in gummy candy and foam candy products mainly to influence texture or viscosity. Preferred hydrocolloids according to the present invention are gelatin, pectin, and agar, or a mixture thereof. Other hydrocolloids which may be used in the composition of the present invention are xanthan gum, guar gum, locust bean gum, cellulose derivatives as carboxymethyl cellulose among others. The hydrocolloid(s) is/are dissolved in as little water as possible in order to obtain a water activity ($a_w$) of less than 0.5 in the final composition.

Preferably, the at least one hydrocolloid is dissolved in no more than 5% (w/w) of water, such as no more than 4% (w/w), no more than 3% (w/w), no more than 2% (w/w), no more than 1% (w/w), e.g. no more than 0.5% (w/w).

In the present invention, a gelatin having a Bloom strength in the range of 100-300, such as at least 180, at least 190, e.g. at least 200 is preferred. It is presently preferred that the gelatin has a Bloom strength in the range of 200-300, more preferably 220-290, even more preferably 240-290 Bloom as a high Bloom strength makes it possible to use a minimum of water.

The glycerin- and protein-based foam candy product or composition of the invention comprises at least one species of a probiotic bacterium. In a preferred embodiment, the probiotic bacteria are non-spore-forming bacteria. Examples of such probiotic bacteria are *Lactococcus, Lactobacillus, Pediococcus,* and *Streptococcus* and more preferably at least one species selected from the group consisting of *Bifidobacterium* spp., *Bifidobacterium breve, Bifidobacterium animalis, Bifidobacterium lactis, Bifidobacterium longum, Bifidobacterium bifidum, Lactococcus lactis, Lactococcus cremoris, Lactobacillus acidophilus, Lactobacillus casei, Lactobacillus kefir, Lactobacillus bifidus, Lactobacillus brevis, Lactobacillus helveticus, Lactobacillus paracasei, Lactobacillus rhamnosus, Lactobacillus salivarius, Lactobacillus curvatus, Lactobacillus bulgaricus, Lactobacillus sake, Lactobacillus reuteri, Lactobacillus lactis, Lactobacillus delbreuckii, Lactobacillus plantarum, Lactobacillus johnsonii* and *Streptococcus thermophilus.*

Particularly preferred strains are *Bifidobacterium animalis* subsp *lactis*, e.g. the strains deposited as DSM 15954 (marketed by Chr. Hansen A/S, Denmark, as)BB-12°; ATCC 27536, and DSM 10140, respectively; *Lactobacillus acidophilus,* e.g. the strain deposited as DSM 13241, *Lactobacillus rhamnosus,* e.g. the strain deposited as ATCC 53103, *Lactobacillus paracasei* subsp. *paracasei*, e.g. the strains deposited as ATCC 55544 and CCTCC M204012, respectively, *Lactobacillus reuteri*, e.g. the strain deposited as ATCC 55845, *Lactobacillus rhamnosus*, e.g. the strain deposited as ATCC 55826, *Lactobacillus paracasei*, e.g. the strain deposited as LMG-P-17806, *Streptococcus thermophilus*, e.g. the strain deposited as DSM 15957, and *Lactobacillus fermentum*, e.g. the strain deposited as NM02/31074.

Combinations of several species or strains of probiotic bacteria can be used, i.e. 2, 3, 4, 5, 6, 7, 8, 9, 10, 11, 12, 13, 14, 15, 16, 17, 18, 19, 20, 21, 22, 23, 24, 25 or even more of the above listed species and strains. In the presently preferred embodiments, only one, two, three, four or five different strains are present in the composition according to the invention.

For products comprising probiotic bacteria, it is common practice to mention the number of probiotic bacteria at the time of manufacture and/or at the end of shelf life. By the term "viable" is meant that the cell is alive and capable of forming a colony in a petri dish during pour plating or spread plating. The number of viable probiotic bacteria is determined as the number of colony forming units (CFU) by pour plate or spread plate methods with incubation under conditions suitable for growth of the probiotic strain(s). By this method, cells capable of growing and forming colonies will be counted. When a number is given in the present specification and claims, it should be understood as CFU/g unless the context indicates otherwise. Preferably, the glycerin- and protein-based candy product of the present invention comprises more than 1×10E9 CFU/unit at end of shelf life (EOS). The end of shelf life is at least 3 months, such as at least 6 months, at least 9 months, at least 12 months, at least 18 months, most preferably at least 24 months. The glycerin- and protein-based candy product of the present invention will generally have a weight between 0.5 and 10 g per unit which means that it is possible to add the necessary amount of probiotic bacteria to obtain the desired CFU at the end of shelf life even under storage at room temperature.

In addition to the probiotic bacteria, one or more other active ingredients, which may be heat and/or moisture-sensitive, for example one, two, three, four or more active ingredients selected from the group consisting of vitamins such as vitamin A, D, E, $K_1$, $K_2$, C, $B_2$, $B_6$, $B_{12}$, biotin, niacin, folic acid, thiamin, and pantothenic acid; minerals such as zinc, selenium, chromium, copper, calcium, chloride or a herbal extract could be included in glycerin- and protein-based composition.

The composition may further comprise at least one flavor, flavor enhancer, color, acid, or sweetener.

The present invention further relates to a process for preparing a foam candy composition comprising heat and/or moisture-sensitive ingredients, such as probiotic bacteria, said composition having a moisture content less than 9% and a water activity ($a_w$) of less than 0.5, wherein said process comprises mixing
  a) glycerin in an amount of at least 5%,
  b) at least one saccharide or at least one polyol which is not glycerin, or a mixture thereof,
  c) at least one protein which is not gelatin,
  d) whipping air into the composition, and adding
  e) at least one heat and/or moisture-sensitive ingredient such as at least one species of a probiotic bacterium.

The process is essentially "non-aqueous". By the term "non-aqueous" is meant a production process where no water has been added. However, some water can be present bound in the composition. Also, addition of a minor amount of water is to be considered within the scope of the present invention.

Although the present inventor has found that it is possible to prepare a mixture of glycerin, at least one protein which is not gelatin, such as hydrolyzed protein, and at least one saccharide without adding any water making it possible to produce a foam candy composition having a low water content and a low $a_w$, it has been found that it is also possible to add a hydrocolloid dissolved in a minor amount water to obtain a more physically stable product and still maintain a low water content and a low $a_w$.

Thus, optionally, at least one hydrocolloid may be added, preferably in a further step before adding the at least one species of a probiotic bacterium. In this embodiment, the addition of a minor amount of water may be necessary because some hydrocolloids need water to dissolve.

Heat and/or moisture-sensitive ingredients such as probiotic bacteria can be added to this composition to provide a product having a high number of viable probiotic bacteria. Although it is preferred that the probiotic bacteria are added after the initial whipping, addition of probiotic bacteria at an earlier step is within the scope of the present invention.

In one embodiment of the present invention, a mixture of glycerin, at least one protein which is not gelatin, and at least one saccharide or at least one polyol, or a mixture thereof, is heated to a temperature of approximately 65° C. and whipped to incorporate air into the composition.

In the embodiment wherein at least one hydrocolloid is used, the hydrocolloid is dissolved in as little water as possible at an appropriate temperature, e.g. for gelatin a temperature of approximately 65° C., and mixed with the mixture of glycerin, at least one protein which is not gelatin, and at least one saccharide and/or at least one polyol.

In one embodiment of the invention, the mixture of glycerin, at least one protein which is not gelatin, at least one saccharide or at least one polyol, or a mixture thereof, and at least one hydrocolloid is cooled down to a temperature of 50 to 60° C., and at least one species of a probiotic bacterium is added as dry powder into the composition e.g. by mixture to ensure even distribution of the probiotics. As will be evident to a person of skill in the art, the intensive mixing i.e. whipping is to take place when the mixture has an appropriate viscosity and the appropriate temperature will thus depend on the choice of hydrocolloid, e.g. the choice of gelatin and Bloom strength. It is presently contemplated that both porcine, bovine and fish gelatins will be useful and that the mixing make take place at a temperature in the range of 40 to 70° C., such as 50 to 60° C., e.g. about 55° C.

In another embodiment of the invention, the mixture of glycerin, at least one protein which is not gelatin, at least one saccharide or at least one polyol, or a mixture thereof, and at least one hydrocolloid is cooled down to a temperature of not more than about 55° C., and at least one species of a probiotic bacterium is added to the surface of the composition while the composition is still sticky. The at least one probiotic bacterium may be present in one or more tablets or granulate.

In some embodiments, the mixing, including the whipping, takes place under low oxygen and/or dry air, e.g. by using carbon dioxide or nitrogen. Also the further handling and storage should preferably take place under dry conditions such as less than 35% RH, preferably less than 30% RH, most preferably less than 25% RH, even more preferably less than 20% RH, such as less than 15% RH.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising", "having", "including" and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

EXAMPLES

Materials and Methods

| Excipients: | | | |
|---|---|---|---|
| Glycerin | | Min. 99.5% purity | Verbio |
| Icing sugar | Finely ground sugar without the addition of anti-caking agents | App. 99.8% purity | Nordic Sugar |
| Citric Acid E330 | Citric Acid E330 | Min. 99.5% | Merck KGaA |
| Gelatin | Fish Skin Gelatin Bloom 280 | | Lapi Gelatine |
| Soluble Gluco Fibre | PROMITOR ® Soluble Gluco Fibre 70R | >70% Soluble Gluco Fibre | Tate & Lyle |
| Hydrolyzed pea protein | PEPTIPEA ® PEA PROTEIN HYDROLYSATE | ~90% Proteins | Triballat Ingredients |

| Flavors: | | |
|---|---|---|
| Orange | ORANGE FLAVOR 055605 TP0551 | Firmenich SA |

| Colors: | | |
|---|---|---|
| Orange | I-Color Orange 700 WSS-P | Chr. Hansen Natural Colors A/S |

Probiotic Bacteria:
*Bifidobacterium animalis* subsp *lactis*

Example 1

Preparation of a foam candy product with icing sugar and probiotic bacteria

Mixture A:

120 g glycerin, 10 g hydrolyzed pea protein and 316 g icing sugar are heated to 65° C. Mixture A is whipped thoroughly with a hand mixer at increasing speed for 2-5 minutes until air has been incorporated into the mixture.

Mixture B:

6 g water (65° C.), 5 g glycerin and 8 g gelatin are mixed and kept at app. 65° C. Mixture B is mixed with mixture A and intensive whipping is continued incorporating air into a combined mixture C which is then cooled down.

Mixture D:

12 g icing sugar, 0.5 g dry Orange flavor, 2 g dry citric acid, 2 g dry color and 20 g *Bifidobacterium animalis* subsp *lactis* are mixed at room temperature.

When Mixture C has cooled down to app. 55° C., mixture D is added under continued whipping to ensure even distribution of the probiotic bacteria, color and flavor.

The resulting foam candy composition is poured or molded into the preferred shape and size and allowed to stand for minimum 1 day.

The water activity in the final foam candy product is measured to app. 0.15.

The total CFU/g after production of the foam candy product is 2.6 E+10 CFU/g.

Example 2

Preparation of a foam candy product with icing sugar and probiotic bacteria

Mixture A:

120 g glycerin, 25 g hydrolyzed pea protein and 300 g icing sugar are heated to 65° C. Mixture A is whipped thoroughly with a hand mixer at increasing speed for 2-5 minutes until air has been incorporated into the mixture.

Mixture B:

6 g water (65° C.), 5 g glycerin and 8 g gelatin are mixed and kept at app. 65° C. Mixture B is mixed with mixture A and intensive whipping is continued incorporating air into a combined mixture C which is then cooled down.

Mixture D:

12 g icing sugar, 0.5 g dry Orange flavor, 2 g dry citric acid, 2 g dry color, and 20 g *Bifidobacterium animalis* subsp *lactis*, are mixed at room temperature.

When Mixture C has cooled down to app. 55° C., mixture D is added under continued whipping to ensure even distribution of the probiotic bacteria, color and flavor.

The resulting foam candy composition is poured or molded into the preferred shape and size and allowed to stand for minimum 1 day.

The water activity in the final foam candy composition is measured to 0.16.

Example 3

Preparation of a foam candy composition with icing sugar and probiotic bacteria

Mixture A:

120 g glycerin, 10 g hydrolyzed pea protein and 316 g icing sugar are heated to 65° C. Mixture A is whipped thoroughly with a hand mixer at increasing speed for 2-5 minutes until air has been incorporated into the mixture.

Mixture B:

3.3 g water (65° C.), 2.4 g glycerin and 4.3 g gelatin are mixed and kept at app. 65° C. Mixture B is mixed with mixture A and intensive whipping is continued incorporating air into a combined mixture C which is then cooled down.

Mixture D:

12 g icing sugar, 0.5 g dry Orange flavor, 2 g dry citric acid, 2 g dry color and 20 g *Bifidobacterium animalis* subsp *lactis* are mixed at room temperature.

When Mixture C has cooled down to 53° C., mixture D is added under continued whipping to ensure even distribution of the probiotic bacteria, color and flavor.

The resulting foam candy composition is poured or molded into the preferred shape and size and allowed to stand for minimum 1 day.

The water activity in the final foam candy product is measured to 0.11.

Example 4

Preparation of a foam candy product with icing sugar and probiotic bacteria

Mixture A:

120 g glycerin, 25 g hydrolyzed pea protein, 50 g soluble gluco fibre, and 257 g icing sugar are heated to 65° C. Mixture A is whipped thoroughly with a hand mixer at increasing speed for 2-5 minutes until air has been incorporated into the mixture.

Mixture B:

3.3 g water (65° C.), 2.4 g glycerin and 4.3 g gelatin are mixed and kept at app. 65° C. Mixture B is mixed with mixture A and intensive whipping is continued incorporating air into a combined mixture C which is then cooled down.

Mixture D:

12 g icing sugar, 0.8 g dry Orange flavor, 2.5 g dry citric acid, 2 g dry color and 21 g *Bifidobacterium animalis* subsp *lactis* are mixed at room temperature.

When Mixture C has cooled down to app. 55° C., mixture D is added under continued whipping to ensure even distribution of the probiotic bacteria, color and flavor.

The resulting foam candy composition is poured or molded into the preferred shape and size and allowed to stand for minimum 1 day.

The water activity in the final foam candy composition is measured to 0.13.

The invention claimed is:

1. A glycerin- and protein-based foam candy product comprising viable probiotic bacteria, comprising:
    (a) glycerin in an amount of at least 5% (w/w),
    (b) at least one saccharide or at least one polyol which is not glycerin, or a mixture thereof,
    (c) at least one protein which is not gelatin, and
    (d) at least one species of a probiotic bacterium, and, optionally
    (e) at least one hydrocolloid,
    wherein the product has a moisture content of less than 9% (w/w) and a water activity (aw) of less than 0.5, and after 3 months storage at room temperature contains more than $10^9$ colony forming units (CFU) viable probiotic bacteria in an amount of product having a total weight between 0.5 and 10 g.

2. The glycerin- and protein-based foam candy product according to claim 1, wherein the at least one protein which is not gelatin is selected from one or more of pea, soy, whey, rice and casein.

3. The glycerin- and protein-based foam candy product according to claim 1, wherein component (b) comprises at least one saccharide that is a mono-, di-, oligo- or polysaccharide, or a mixture of at least two saccharides.

4. The glycerin- and protein-based foam candy product according to claim 1, wherein component (b) comprises at least one saccharide that is a disaccharide.

5. The glycerin- and protein-based foam candy product according to claim 1, wherein component (b) comprises a mixture of at least one mono- or disaccharide and at least one oligo- or polysaccharide.

6. The glycerin- and protein-based foam candy product according to claim 1, wherein component (b) comprises one or more saccharides selected from the group consisting of fructo-oligosaccharides (FOS), galactooligosaccharides (GOS), soluble corn fiber, and inulin.

7. The glycerin- and protein-based foam candy product according to claim 1, wherein the at least one hydrocolloid is gelatin, pectin, or agar, or a mixture thereof.

8. The glycerin- and protein-based foam candy product according to claim 1, further comprising one or more of a flavor, flavor enhancer, color, acid, sweetener, vitamin, mineral, and herbal extract.

9. The glycerin- and protein-based foam candy product according to claim 1, in the form of a single phase candy composition having the probiotic bacteria dispersed therein.

10. The glycerin- and protein-based foam candy product according to claim 1, in a form having two or more phases wherein the probiotic bacteria are dispersed in one or more of the phases.

11. The glycerin- and protein-based foam candy product according to claim 10, further comprising at least one vitamin, mineral, or herbal extract dispersed in one or more of the phases.

12. A process for preparing a glycerin- and protein-based foam candy product comprising glycerin in an amount of at least 5% (w/w) and viable probiotic bacteria, comprising:
mixing without addition of water:
(a) glycerin in an amount of at least 5% (w/w),
(b) at least one saccharide or at least one polyol which is not glycerin, or a mixture thereof,
(c) at least one protein which is not gelatin,
to form a glycerin- and protein-based foam candy composition, and
adding (d) at least one species of a probiotic bacterium,
wherein the product has a moisture content less than 9% (w/w) and a water activity (aw) of less than 0.5, and after 3 months storage at room temperature contains more than $10^9$ colony forming units (CFU) viable probiotic bacteria in an amount of product having a total weight between 0.5 and 10 g.

13. The process according to claim 12, further comprising adding at least one hydrocolloid dissolved in no more than 5% (w/w) of water.

14. The process according to claim 12, wherein the mixing comprises mixing under low oxygen and/or dry air.

15. The process according to claim 12, wherein the at least one species of a probiotic bacterium is incorporated into the glycerin- and protein-based foam candy composition, added on the surface of the glycerin- and protein-based foam candy product, added between two or more layers of the glycerin- and protein-based foam candy composition, or added between a glycerin- and protein-based foam candy composition and a gummy candy composition.

* * * * *